United States Patent Office 3,533,775
Patented Oct. 13, 1970

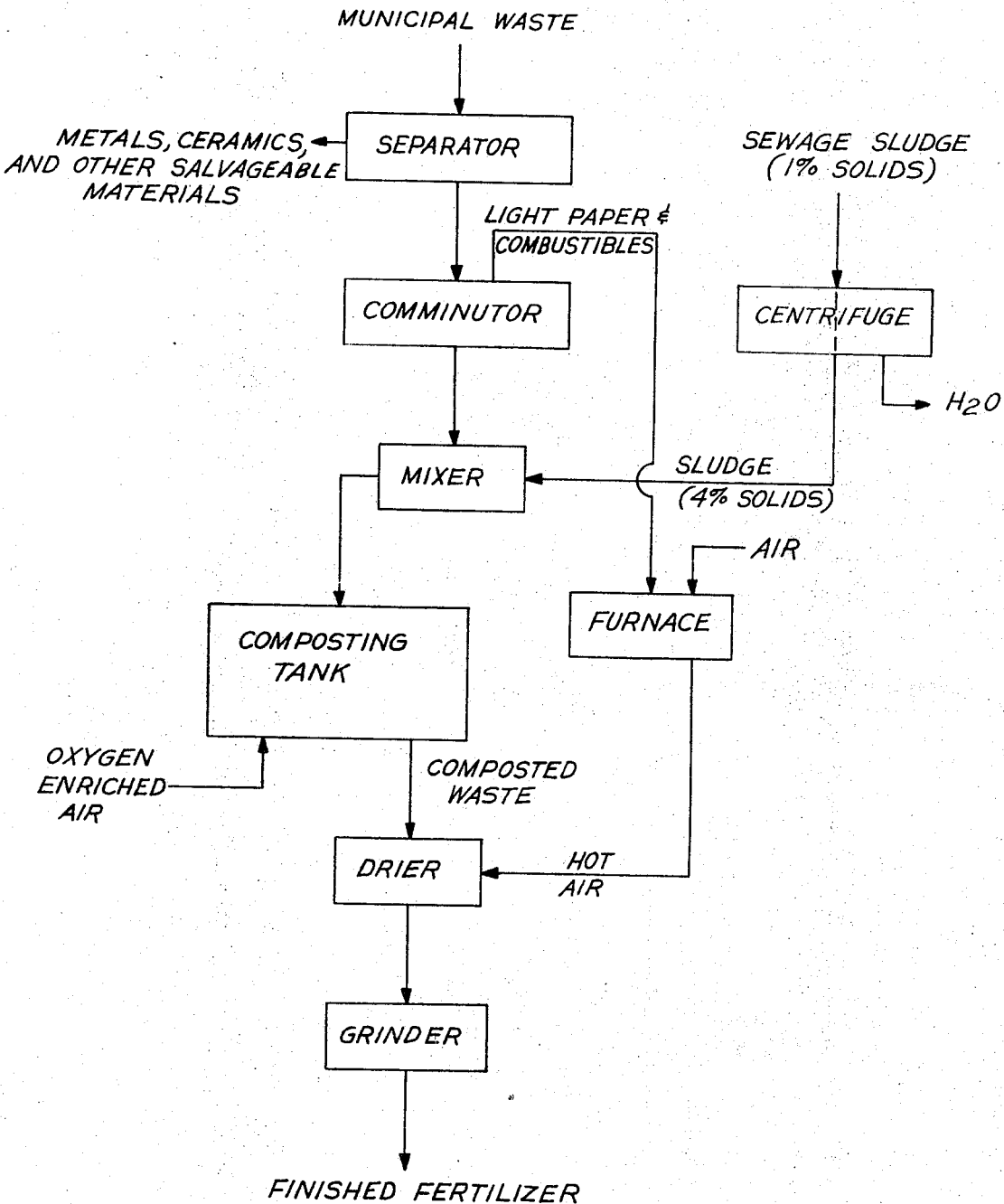

3,533,775
PROCESS FOR AEROBICALLY PREPARING FERTILIZER FROM A MIXTURE OF MUNICIPAL WASTE CONTAINING PAPER WITH SEWAGE SLUDGE
Victor Brown, Elmhurst, Ill., assignor to Metropolitan Waste Conversion Corporation, Wheaton, Ill., a corporation of Delaware
Filed Oct. 21, 1966, Ser. No. 588,359
The portion of the term of the patent subsequent to May 28, 1985, has been disclaimed and dedicated to the Public
Int. Cl. C05f 7/00, 9/04, 13/00
U.S. Cl. 71—9     2 Claims

ABSTRACT OF THE DISCLOSURE

Sewage sludge and municipal waste, the latter comprising at least 50% paper, are processed by removing the salvageable scrap and inert materials from the municipal waste, comminuting the remaining waste, removing a part of the combustible materials, comprising a portion of aforesaid paper content, from the comminuted waste, mixing de-watered sewage sludge with the remaining waste, and composting the mixture by aerobic digestion. The composted material is dried by hot air obtained by burning the removed combustible materials.

---

This invention relates to an improved process for total municipal waste disposal including converting both sewage sludge and town and house waste to quality fertilizer by composting. One object of my invention is to provide a flexible disposal process in which all municipal waste is converted to a useful product or is completely disposed of with the least expense, effort, and nuisance. The waste contains a wide variety of materials, including (1) salvageable materials such as paper, rags, metal and cardboard; (2) inert materials like tires, bottles, ceramics, bricks, concrete, plastic bottles; (3) easily combustible materials consisting mostly of plastic film and light, dry paper; and (4) the remainder consisting of heavy, wet paper, garbage, grass clippings and other organic vegetable matter which can be composted. Currently the waste material picked up by scavengers from city households contains a relatively high proportion of paper, that is, at least 50% of the waste material, and a relatively low proportion of garbage. This ratio has been increasing in the direction of paper as the number of garbage disposal units in use increases and as more and more food and other products used in the home are individually packaged in paper cartons of various types. The reduction in compostable organic material is reflected in a compost fertilizer which is so low in nitrogen as to be of little practical value.

Sanitary disposal of this solid waste material is a major municipal problem in the United States today. Proper disposal of sewage solids is also a major problem of municipalities. Both are uniquely solved in accordance with my invention. In accordance with the present invention, sewage sludge discharged from a city sewage disposal plant, after primary sedimentation, is added to the high cellulose waste prior to composting, but after removing salvageable and noncombustible materials. The sludge compensates for the lack of nitrogenous organic material in the waste to provide an improved quality fertilizer. Thus, the composting plant can be located adjacent the sewage plant to take care of all city wastes at a single location.

In a preferred embodiment of the process of the invention, the salvageable materials are manually, pneumatically, mechanically, or electromagnetically removed and sold as scrap and the inert materials are removed and sent to land fill disposal tracts. The remaining waste is comminuted and a substantial quantity of the paper and film plastic is removed and burned to supply heat for evaporating water from the sewage sludge, for drying the composted organic waste, or for other energy needs. In a city of approximately one million population, the town and house waste amounts to about 2,000 tons per day, about 75% of which is paper. One ton of paper provides the same quantity of heat as one barrel of oil or approximately 5,000 B.t.u. per cubic foot. This feature gives flexibility to the composting process. In seasons when compost demand is light a proportionately larger quantity of paper may be removed and burned. When compost demand is heavy, the minimum amount of paper necessary to provide fuel may be removed and the remainder composted.

I have also found that aerobic digestion of the comminuted waste and sludge is accelerated by enriching with oxygen the air fed to the composting tank. A preferred apparatus for carrying out the composting with agitation and in the presence of air is shown and described in my copending application, Ser. No. 357,423, filed Apr. 6, 1964, now Pat No. 3,294,491 and includes a false bottom or the like through which air may be intimately diffused into the organic mass being composted. The air surrounding the organic waste particles must have a minimum of 6% oxygen for efficient composting and preferably the oxygen content should be maintained at 20% to 35%. Below the 6% minimum, the digestion is so slow as to increase the cost of the process beyond economic feasibility. Atmospheric air, of course, contains approximately 20% oxygen, but this oxygen is quickly utilized in the aerobic digestion process and the proportion of oxygen in the air within the mass is likely to fall below 6% if the incoming air is not enriched. The presence of raw primary or activated sewage solids in the digesting mass greatly increases the biochemical oxygen demand and makes the addition of oxygen of greater value and importance than in composting town waste only.

In the single figure of the drawing, I have illustrated my improved process by a flow sheet showing the essential apparatus and the flow of materials therethrough. The town and house waste, as indicated, contains garbage, paper packages of various kinds, grass clippings, leaves, some old bottles, pieces of metal, and the like. The first step in the process consists in separating from this waste large pieces of metal such as bed springs, old ice boxes, bottles, and other salvageable, noncombustible or non-decomposable matter. The large nonferrous and ferrous pieces are removed manually and the smaller pieces of ferrous metal are removed magnetically after a rough preliminary grind. The pieces that have salvage value are sold as scrap and the remainder is sent to land fill. The waste, devoid of metals and ceramics, is then fed to a comminutor of the hammer-mill type which subdivides the waste material into a relatively small particle size, say ¼" to 1½" mesh. This comminuting step shreds the light, dry paper and plastic film in the waste, which paper and plastic are removed by vacuum and sent to a furnace to produce heat for various purposes as mentioned hereinafter. Details with respect to removal of paper for purposes of supplying heat are disclosed in my copending application, Ser. No. 529,127, filed Feb. 21, 1966, which has matured to Pat. No. 3,385,687. The amount of paper removed is preferably well in excess of about 15% of the total quantity present. The amount of paper in the remaining waste may range from 25 to 55% by weight.

The said comminuted remaining waste with a large amount of the paper removed is then deposited in a series of many relatively thin layers (about ½" thick) over the bottom of the composting tank to build up the mass to the desired depth. The total depth may range from four to ten feet or more after all material constituting a complete batch has been added. In this way, the constituents of the waste are spread out uniformly through the mass rather than localized as would be the case if the material were charged into the tank to full depth as received rather than spread over the entire tank bottom in a series of layers.

To enrich the mass with compostable organic matter, sewage sludge is added to the composting tank simultaneously with the town and house waste. The sludge is obtained from primary sewage which has been screened to filter out large materials and then permitted to settle. The thickened sludge which contains about 1% solids after removal of the effluent is pumped from the sewage disposal plant to the composting plant where the sludge is passed through a centrifuge system to remove water. Sufficient water is removed from the sludge to concentrate it to 4%–9% solids. This material is then discharged into a mixer for thoroughly mixing with the aforesaid comminuted remaining waste in the proportion of about 50 to 150 pounds (preferably 100 pounds) of sludge per 100 pounds of waste. If the waste material in the tank contains relatively large proportions of paper, it is desirable to increase the solids content of the sludge. Paper, of course, is essentially cellulose and does not contribute any nitrogen or other plant food elements to the fertilizer produced by composting. Therefore, the lack of plant food elements is well compensated for by increasing the quantity of sludge added to the waste material. Shredded paper, on the other hand, is very absorptive and permits the disposal of sewage sludge by further reducing the moisture content to levels where aerobic composting is possible.

To obtain uniformity of the mixture of sludge and waste material, the two constituents can be admixed in a double screw type mixer prior to charging into the composting tank. Oxygen-enriched air is introduced beneath a false bottom in the composting tank to accelerate aeration of the mass. Simultaneously, the mass is agitated using an agitating apparatus of the type shown in my copending application, Ser. No. 524,344, field Feb. 1, 1966, and now Pat. No. 3,438,740. This agitator moves to and fro lengthwise of the tank to aerate and mix the mass of material to accelerate decomposition and promote uniformity of the final fertilizer product. The addition of oxygen, particularly in the early stages of digestion, serves to meet the biological oxygen demand of the sludge during digestion.

For most rapid composting, it is desirable to maintain about 55/60% moisture in the mass of waste and sludge. The digestion is carried out in two phases, the first phase consisting of mesophilic digestion in the range of about 110° F. for about twenty-four hours. This is followed by thermophilic digestion at about 140° F. for another twenty-four hour period. The mass is then sterilized by allowing the temperature to rise to about 165° F. for approximately forty-eight hours. This destroys pathogens from the sewage sludge. These periods of time can be reduced by enriching the air with oxygen so that the air contains from 25%–35% oxygen as it enters the mass. The sterilized material is then passed through a dryer, hot air for which is supplied from the furnace fired by the removed paper. The dried compost fertilizer is then ground to the desired particle size and bagged for use in treating lawns and for other agricultural purposes.

From the foregoing, it is apparent that I have provided an improved process which disposes completely of all municipal waste in a most efficient and economic manner. It will be appreciated that more or less of the several classes of materials may be disposed of in different ways depending upon market conditions and the make up of the waste. For example, if there is no market for rags and salvageable paper, these may be disposed of by burning. Likewise, if there is not enough organic material to provide a good compost, these materials may be incinerated. If for some reason the amount of paper is very low, the vacuum lift from the comminutor to the furnace may be closed and all the paper composted.

The invention eliminates the need of secondary treatment facilities for the sludge, together with the labor and expense in carrying out the treatment. This markedly reduces the cost of the sewage plant without increasing the cost of the composting plant (except for the cost of the centrifuge). Further there is no significant market for digested sludge, but there is a significant market for compost. The compost made in accordance with the invention is characterized by superior soil conditioning and nutrition and constitutes no health hazard because the sewage sludge is completely digested.

Other modifications in my process will occur to those skilled in the art and it is my intention in setting forth specific examples not to limit the invention other than is necessitated by the scope of the appended claims.

What is claimed is:

1. A method of composting which comprises separating salavageable and inert materials from municipal waste containing at least 50% paper, comminuting the waste, removing at least 15% of the paper from the waste, mixing with the remaining waste sewage sludge containing from 4%–9% solids, composting the mixture by aerobic digestion in air supplied to the mixture, burning the comminuted paper removed from the waste to heat air and drying the digested mixture by passing the same through a dryer supplied with said heated air.

2. The method of claim 1 in which the quantity of sewage sludge added ranges from 50 to 150 pounds per 100 pounds of waste.

References Cited

UNITED STATES PATENTS

| | | | |
|---|---|---|---|
| 1,980,244 | 11/1934 | Wright. | |
| 2,220,134 | 11/1940 | Townsend | 71—13 XR |
| 2,285,834 | 6/1942 | Proctor | 71—9 |
| 2,798,800 | 7/1957 | Geraghty et al. | 71—9 |
| 3,113,014 | 12/1963 | Forth | 71—9 |
| 3,385,687 | 5/1968 | Brown | 71—13 |

REUBEN FRIEDMAN, Primary Examiner

B. H. LEVENSON, Assistant Examiner

U.S. Cl. X.R.

71—13